United States Patent
Berg et al.

(10) Patent No.: US 6,984,733 B2
(45) Date of Patent: Jan. 10, 2006

(54) MANUFACTURING PROCESS FOR POROUS MATERIAL

(75) Inventors: Hans Berg, Uppsala (SE); Mats Carlsson, Uppsala (SE)

(73) Assignee: Amersham Biosciences AB, Uppsala (SE)

(*) Notice: Subject to any disclaimer, the term of this patent is extended or adjusted under 35 U.S.C. 154(b) by 0 days.

(21) Appl. No.: 10/451,194

(22) PCT Filed: Dec. 19, 2001

(86) PCT No.: PCT/EP01/15014

§ 371 (c)(1),
(2), (4) Date: Jun. 19, 2003

(87) PCT Pub. No.: WO02/053598

PCT Pub. Date: Jul. 11, 2002

(65) Prior Publication Data

US 2004/0039193 A1    Feb. 26, 2004

(30) Foreign Application Priority Data

Dec. 29, 2000 (SE) .................................... 0004928

(51) Int. Cl.
*C08B 37/00* (2006.01)

(52) U.S. Cl. .................. 536/124; 536/123.1; 536/102; 536/56; 536/55.1; 536/45

(58) Field of Classification Search ............... 536/45, 536/55.1, 56, 102, 123.1, 124

See application file for complete search history.

(56) References Cited

U.S. PATENT DOCUMENTS

| | | | |
|---|---|---|---|
| 3,651,043 A | 3/1972 | Ghetie et al. | |
| 5,573,994 A | 11/1996 | Kabra et al. | |
| 5,827,937 A * | 10/1998 | .ANG.gerup | ........... 536/123.12 |

FOREIGN PATENT DOCUMENTS

| | | | |
|---|---|---|---|
| WO | WO92/18237 | | 10/1992 |
| WO | WO 95/20620 | * | 8/1995 |
| WO | WO96/02577 | | 2/1996 |
| WO | WO 97/17132 | * | 5/1997 |
| WO | WO97/38018 | | 10/1997 |
| WO | WO 97/38018 | * | 10/1997 |
| WO | WO00/17257 | | 3/2000 |

* cited by examiner

*Primary Examiner*—James O. Wilson
*Assistant Examiner*—Ganapathy Krishnan
(74) *Attorney, Agent, or Firm*—Royal N. Ronning, Jr.; Yonggang Ji

(57) ABSTRACT

A method for the manufacture of a solid porous separation material based on a polysaccharide, said method comprising the steps of: (a) providing an aqueous solution (I) of a polysaccharide, (b) solidifying the solution, preferably by transforming the solution to a gel, and (c) optionally crosslinking the polysaccharide, with the proviso that, if step (c) is present, steps (b) and (c) may be carried out simultaneously. The method is characterized in that the polysaccharide provided in step (a) is modified by being inter-molecularly crosslinked to an extent such that the viscosity of the solution (I) is at least 110%, preferably at least 200%, of the viscosity of an aqueous solution (II) of the corresponding polysaccharide which has not been intermolecularly crosslinked and which is present in the same concentration as the inter-molecularly crosslinked polysaccharide is in solution (I)

11 Claims, No Drawings

MANUFACTURING PROCESS FOR POROUS MATERIAL

TECHNICAL FIELD AND BACKGROUND TECHNOLOGY

The present invention is a method for the manufacture of a porous material from a polysaccharide. The starting polysaccharide used in the innovative method has been modified such that it will give an aqueous solution (solution I) which has a viscosity that is higher than the viscosity of the corresponding solution (solution II) in which the unmodified polysaccharide is present in essentially the same concentration. Other conditions for solutions I and II are the same.

By the term "unmodified polysaccharide" is meant the polysaccharide or the polysaccharide derivative that has been used to synthesise the modified polysaccharide that has an increased viscosity.

According to previous techniques, processes comprising the steps of:
(a) forming an aqueous solution (I) of a suitable polysaccharide,
(b) solidifying the solution, and
(c) optionally cross-linking the polysaccharide to become insoluble have resulted in porous polysaccharide material. Steps (b) and (c) has been performed simultaneously or in sequence. The term "solidifying" primarily has meant transforming the solution to a gel.

The material so obtained has been used as support matrices in separation methods, such as electrophoresis, chromatographic and batch-mode separations based on adsorption and/or size exclusion, cell culturing (as microcarriers) etc.

This production technology can give beads if the solution is emulsified in an organic solvent, which is not miscible with water (water-in-oil emulsions). By including the proper derivatization reagent in the solution, it will be possible to form inter- as well as intra-molecular cross-links to an extent that will insolubilize the polysaccharide and solidify the drops. An insoluble cross-linked 3-dimensional polymeric polysaccharide network will form. An alternative way to produce beads has been to select a polysaccharide that dissolves in aqueous liquid media when warmed and solidifies to a gel when the temperature of the solution is decreased.

In this variant the polysaccharide may be cross-linked simultaneously or subsequent to the gelling reaction.

In the case the solution is transformed to a gel without prior emulsification monolithic material will form.

Cross-linking is imperative for gel formation in case the polysaccharide is of the kind that lacks or has a too low gelling temperature. Otherwise cross-linking is optional and depends on use.

Cross-linking means that the rigidity of the material will increase which in turn means that the material may be better fitted to uses requiring application of pressure, for instance liquid chromatography.

The pore sizes of the material obtained primarily depend on the concentration of polysaccharide in the solution provided in step (a).

Sometimes monolithic materials with very large pores (macropores or superpores) are desired. Typical large pores have diameters >0.2 $\mu$m, such as $\geq$0.5 $\mu$m. In this case one starts with forming an oil-in-water solution where the water phase comprise the polysaccharide. The system is then transformed to a gel by cooling and/or cross-linking in the same manner as for a material with smaller pores. In the case beads with large pores are desired, the oil-in-water emulsion is emulsified into an organic solvent that is not miscible with water, whereafter the aqueous solution is transformed to a gel in the same manner as discussed above. See U.S. Pat. No. 5,723,601 (Amersham Pharmacia Biotech AB), WO 0017257 (Amersham Pharmacia Biotech AB) and WO 0012618 (Amersham Pharmacia Biotech AB).

Alternative ways for producing porous polysaccharide beads include so-called atomisation techniques in which free drops of the polysaccharide solution (solution I) is created. These variants can be illustrated by spraying the solution in an air stream (WO 9702125, FMC Corporation) and WO 0029466, XC Corporation)) or by the so-called spinning disc atomisation (WO 9520620 (Biodev AB)).

Alternative ways include coating of individual solid particles with the polysaccharide solution (solution I) prepared in step (a) followed by solidifying the solution as in step (b) with an optional subsequent cross-linking (step (c)). See for instance WO 9200799 (Upfront Chromatography AS).

WO 9738018 discloses a process for the production of a cross-linked polysaccharide gel. More specifically, this application teaches a method of preactivating an agarose solution to a suitable degree. After such a preactivation, the solution is solidified and the activated group can then be used as a cross-linker to improve the rigidity of the gel.

U.S. Pat. No. 5,827,937 also relates to providing an activated polysaccharide. This is achieved by sterically preventing completion of the cross-linking, whereby an activated polysaccharide is obtained. At a later stage, the polysaccharide is reactivated and the cross-linking is then allowed to proceed to a viscoelastic gel.

Drawbacks of Earlier Techniques

The above-mentioned processes have certain drawbacks. For instance, if one is to incorporate densifying particles by dispersing the particles into the solution, the viscosity of the solution is typically not high enough. The densifying particles will have strong tendency to separate out without being incorporated into the final polysaccharide material. In the case the goal is to produce polysaccharide beads containing densifying particles the portion of beads without densifying material will be unacceptable high. This drawback in particular applies for the kind of beads disclosed in WO 971732 (Amersham Pharmacia Biotech AB) (bead density >1 g/cm$^3$ such as $\geq$1.2 g/cm$^3$ (in a wet swollen state) and densifying particles with a density $\geq$3 g/cm$^3$).

It is also likely that viscous compared to non-viscous polysaccharide solutions have advantages in the so-called atomisation techniques. Compare e.g. WO 9520620 (Biodev AB).

These problems can not simply be overcome by conventionally increasing the viscosity by (a) increasing the concentration of the polysaccharide, (b) cooling the solution, (c) adding thickeners etc. Increasing the concentration of the polysaccharide leads to decreased pore sizes, which is a drawback if material with smaller pores is to be produced. Cooling is of limited value due to the fact that most polysaccharides and polysaccharide derivatives precipitates or gels when cooled. Addition of thickeners tends to give inhomogeneities in the final material.

Objects of the Invention

The objectives of the invention are to provide a manufacturing method as defined above in which the above-mentioned drawbacks have been minimised. This in particular applies to the manufacture of beaded material containing one, two, three or more densifying particles bead including coating procedures and the manufacture of beads by atomisation techniques such as spinning disc atomisation and spraying.

The Invention

The invention thus is an improved variant of the method given in the introductory part. The main characterising feature is that the polysaccharide used is inter-molecularly cross-linked to an extent such that the viscosity of solution (I) is at least 110%, preferably at least 200% such as at least 500%, of the viscosity of an aqueous solution (II) of the corresponding polysaccharide which has not been inter-molecularly cross-linked. The concentration of the corresponding polysaccharide in solution (II) is essentially the same as the concentration of the inter-molecularly cross-linked polysaccharide in solution (I).

Accordingly, the present invention provides a method wherein the viscosity of the polysaccharide is influenced or set before the solidification and this can be performed without any effect on the pore size in the final product. Accordingly, the viscosity is set to a predetermined value, as compared e.g. to the above-discussed WO9738018 wherein the viscosity will be a result of the preactivation, which is the main aim. Thus, said WO 9738018 accepts the viscosity obtained for each preactivation, contrary to the present invention, which is directed to obtaining a desired viscosity.

As discussed above the term "corresponding polysaccharide" refers to the polysaccharide or polysaccharide derivative which has been derivatized to an increased viscosity. Derivatisation in this particular context thus includes any side reaction that takes place in parallel with the introduction of inter-molecular cross-links. A typical side reaction is intra-molecular cross-linking.

This kind of derivatization can be accomplished by the aid of a polysaccharide chain association reagent, which typically acts as a cross-linking reagent. In other words this kind of reagents permits formation of bridges between polysaccharide chains thereby making the chains longer and the corresponding solutions more viscous.

There are mainly two kinds of polysaccharide association reagents:

(1) bifunctional reagents (including multifunctional reagents) in which each functional group is capable of reacting directly with a hydroxy group of the polysaccharide or an activated form thereof to give a covalent bond (homobifuctional reagents), and (2) bifunctional reagents (including multifunctional reagents) in which only one functional group is capable of forming a covalent bond with the polysaccharide while the other functional groups can be activated for reaction after the first function has reacted (heterobifunctional reagents).

Directly reactive functional groups can be illustrated with electrophilic groups such as epoxides; haloalkyl groups such as halohydrins, vicinal dihalides, α-halocarbonyls; activated esters; acid halides etc. In one and the same chain association reagent, the reactive functional groups may be identical or different.

Functional groups in the chain association reagent that require activation of the hydroxy group of the polysaccharide are typically nucleophilic, such as amino, hydroxy etc. Activation of hydroxy groups of the polysaccharides often means transformation to electrophilic groups, for instance of the type given in the preceding paragraph.

Bifunctional reagents of the second type (2) are illustrated by reagents in which (a) the activatable function is an unsaturation, i.e. a carbon-carbon double or triple bond, and (b) the other function is represented by groups that are directly reactive with hydroxy in the polysaccharide or an activated form thereof.

The directly reactive group of these reagents can be selected according to the same rules as for the type (1) reagents. Once inserted onto the polysaccharide the groups with a concealed reactivity may be activated, e.g. by halogenation or epoxidation. Alternatively they may be caused to react with each other, for instance via free radical reactions. Typical examples of popular unsaturated groups are alkene groups such as in allyl and in acryl esters, acryl amides and the corresponding methacryl variants.

The intra-molecularly cross-linked polysaccharide provided in step is water-soluble. It is typically based on a native polysaccharide that is water-soluble as such or that has been derivatized to become water-soluble. Derivatization in this context means that groups that are hydrophilic as such or that disturb the native conformation of a water-insoluble polysaccharide have been introduced. Accordingly the inter-molecularly cross-linked polysaccharide may be based on a native polysaccharide such as dextran, agarose, cellulose, starch, pullulan etc. For some kind of porous polysaccharide matrices it is an advantage to use a polysaccharide in step (a) that dissolves in warm water but gels or solidifies upon cooling. Typical examples of this kind of polysaccharides are agarose and certain modified forms thereof, hydroxyalkylated celluloses etc.

Derivatization of native polysaccharides that then can be intra-molecularly cross-linked and used in step (a) means introduction of organic groups such as charged groups (e.g. carboxy groups, sulphonic acid groups, ammonium groups), neutral groups that may be hydrophilic (e.g. hydroxy lower alkyl groups and lower alkyl groups) etc. By lower alkyl is typically meant $C_{1-3}$ alkyl groups (methyl, ethyl, propyl) or any other alkyl group that introduces the desired properties on the native or derivatized polysaccharide.

The degree of cross-linking in the polysaccharide that is provided in step (a) should be such that the polysaccharide is water-soluble at the temperature used for producing solution (1). This means that the conditions and reagents used for its synthesis should be selected such that unacceptable amounts of inter- and intra-molecular cross-links are not formed.

A suitable quality of a polysaccharide for step (a) may be obtained by using a very low amount of chain association reagent compared to the amount of polysaccharide. If the amount is too high the risk for quick insolubilization becomes significant. The actual amount will depend on factors such as molecular weight of the reagent, its reactive groups and their ability to participate in side reactions, the amount of polysaccharide etc. There are advantages in monitoring the proceeding of the reaction by the measurement of the change in viscosity and stopping the reaction when the desired viscosity has been obtained. See the experimental part for a general guideline how to control the synthesis.

It has been found that the concentration of the inter-molecularly cross-linked polysaccharide required for predetermined porosity may be essentially the same as the concentration of the corresponding non-cross-linked polysaccharide. This gives practical advantages since the concentrations of the polysaccharide that is provided in step (a) can be set according to well-established practice while at the same time avoiding the drawbacks discussed above.

Porosity values and/or pore sizes of polysaccharide matrices are often expressed as exclusion limits in terms of how large portion of the material a particular compound can utilise (Kav). See Hagel in "Protein Purification, Principles, High Resolution, and Applications", J-C Janson and L Rydén (Eds), VCH Publishers Inc. New York, 1989, p. 99. Typical Kav values are within the interval of 0.10–0.95 and may depend also on further derivatization of the material, for instance introduction of so-called extenders (WO 9822572, Amersham Pharmacia Biotech AB). This means that for the matrix as it is obtained in step (c), the typical interval is somewhat narrower such as 0.40–0.95.

The polysaccharide material will always contain so-called smaller pores (micropores) in which mass transport is taking place by diffusion. In addition there may also be present larger pores (macropores or superpores) in which mass transport can take place by convection. The size range for the micropores is typically 20–5000 Å and for the superpores 0.5–100 μm. For material in form of porous beads, the ratio between the pore diameters of the macropores and the bead diameter typically is in the interval 0.01–0.3, with preference for 0.05–0.2. The ratio between the pore diameters of the micropores may in the preferred variants extend up to 0.05 but is otherwise below 0.01.

See for instance WO 0017257 (Amersham Pharmacia Biotech AB), WO 0012618 (Amersham Pharmacia Biotech AB) and WO 9319115 (Amersham Pharmacia Biotech AB).

The material can be in form of a population of porous beads or a porous monolith.

The mean bead diameter may vary depending on the use but as a general rule is within the interval of 1–1000 μm, preferably 1–50 μm for high performance applications and 50–300 μm for preparative purposes. A population of beads produced may be mono disperse (monosized) or poly dispersed (polysized). By a mono disperse population of beads is contemplated that more than 95% of the beads have diameters (hydrodynamic diameters) within the mean diameter of the population ±5%. The manufacture of beads having a certain mean bead diameter and bead size distribution is done according to established practice.

Beads having densities above about 1 g/cm$^3$ (in a wet swollen state) are used in separation methods involving adsorption to beads that have been fluidised by an upward liquid flow. The liquid then typically is aqueous with a density around 1 g/cm$^3$. This kind of beads may be produced by the aid of the present invention which then means that densifying minor particles are dispersed into the aqueous solution prepared in step (a) whereafter the solution is made into drops that are allowed to solidify. There may be one, two or more filler particles per bead. A produced population of beads may have a distribution of densifying particles in the beads or the same number of densifying particles in each bead. The densifying particles may be porous or non-porous. This kind of beads have been described in WO 9218237 (Amersham Pharmacia Biotech AB); WO 9717132 (Amersham Pharmacia Biotech AB); WO 9833572 (Amersham Pharmacia Biotech AB); and WO 9200799 (Kem-En-Tek/ Upfront Chromatography A/S). This kind of beads may also be produced by so called atomisation techniques that have been discussed in general terms above. Beads not having the desired density are removed, for instance beads lacking or having too many densifying particles.

According to the invention this kind of heavy polysaccharide beads may also be prepared by coating individual densifying particles by the polysaccharide solution provided in step (a). After coating the solution is allowed to solidify (step (b)). The densifying core particle may be porous in order to accomplish beads with large surface area. See U.S. Pat. No. 5,837,826 (Flickinger et al).

The densifying particles are in most cases based on inorganic material for instance glass, quartz, metal, metal alloy, metal salts etc. Typical densities of the particles are $\geq 1.5$ g/cm$^3$. See WO 9218237 (Amersham Pharmacia Biotech AB) and WO 9717132 (Amersham Pharmacia Biotech AB). The latter explicitly discloses densifying material that is below and above, respectively, 3 g/cm$^3$ (but always above 1 g/cm$^3$). The relative amount of the densifying material may vary depending on the use of the end product, but typically it constitutes from a 1–5% up to about 70% based on volume per volume. For coated densifying particles the particle may constitute up to 90–95% of the total bead volume.

The material may be derivatized to contain functional groups (ligands) that are used in an adsorption method to bind a desired substance to the material. Functionalization is typically taking place after step (c), but may if the ligand does not to any significant negative extent interfere with steps (a) through (c) be done before step (a). Typical ligands are members of so called affinity pairs, more particular bio-affinity pairs.

Well-known affinity pairs (ligand-receptor pairs) are (a) oppositely charged entities (ion exchange groups; the immobilised entity being selected among primary, secondary, tertiary and quaternary ammonium, sulphonate, sulphate, phosphonate, phosphate, carboxy etc groups), (b) antibodies and antigens/haptens, (c) lectins and carbohydrate structures, (d) IgG binding proteins and IgG (Protein A and IgG, Protein G and IgG etc), (e) pair of hydrophobic groups, (f) chelators and chelates, (g) complementary nucleic acids, (h) cells and cell binding ligands, Affinity members also include entities participating in catalytic reactions, for instance enzymes, enzyme substrates, cofactors, co-substrates etc. Members of cell-cell and cell-surface interactions and a synthetic mimetic of bio-produced affinity members are also included.

A further kind of ligands is able to create reversible covalent bonds during the adsorption step, for instance by containing so called reactive disulphides, —S—SO$_n$— where n is an integer 1 or 2 and the free bonds bind to saturated and/or unsaturated and/or aromatic carbons.

Step (b) above is carried out by any of the known techniques for preparing porous monoliths or population of beads from polysaccharide solutions. Thus monoliths may be obtained simple by cross-linking the intra-molecularly polysaccharide dissolved the solution (I), or, if macroporous materials are desired, by first forming an inverse emulsion from the solution.

Material in beaded form may be obtained by emulsifying the solution in an organic solvent not miscible with water before solidification of the solution. In the alternative, atomisation techniques or conventional coating procedures of particulate material are applicable as well. See above.

For more details of applicable techniques, see the publications discussed above.

The invention will now be illustrated in the experimental part giving proof of principle. The invention is further defined in the appending claims.

EXPERIMENTAL PART

Example 1

Preparation of High Viscosity Agarose Solution

An agarose solution is prepared in a batch reactor by adding 40 g of agarose to 1000 ml of distilled water under stirring at 95° C. After 2 h the solution is cooled to 60° C. and 5 ml of aqueous NaOH (50%) and 1.5 ml of 1,4-butane-dioldiglycidylether are added to the agarose solution. 1,4-Butane-dioldiglycidylether will now intra-molecularly and inter-molecularly cross-link the polysaccharide chains and the viscosity will increase continuously. When the desired viscosity is reached the cross-linking reaction is stopped by neutralisation with 60% acetic acid to pH=7. Before the reaction started the viscosity was 180 centipoise (60° C., pH 7–8) and after 3.5 h of reaction the viscosity was 1200 centipoise (60° C., pH 7–8) and after 5 h the viscosity was 2200 centipoise (60° C., pH 7–8).

The viscosity at 3.5 h is 670% of the viscosity of the starting agarose solution. At 5 h the viscosity is about 1200% of the starting agarose solution.

Example 2

Solidifying the Agarose Solution to Beads (Gel) by Emulsification.

The emulsion media is made in an emulsion reactor by adding 45 g of ethyl cellulose (N-50 emulsifier) to 580 ml of toluene under stirring at 60° C. The dissolving of N-50 in toluene takes approximately 2 h.

The stirring is regulated to 115 rpm. 400 ml of agarose solution (1200 centipoise (60° C., pH 7–8)) from Example 1 is transferred to the emulsion media whereby drops of agarose solution are formed. After 0.5 h of emulsification the mixture is cooled during approximately 10 h to below 25° C. The beads were washed under stirring with ethanol 99.5%, which is decanted. Thereafter the beads were washed on a glass filter with ethanol 99.5% and distilled water.

Cross-linking the Gel 40 g Na$_2$SO$_4$ are added to a reactor containing a solution of 260 ml of gel (drained) and 65 ml distilled water under stirring. The reaction temperature is increased to 50° C. and 4 g of aqueous NaOH (50%) and 0.3 g of NaBH$_4$ are added to the solution as well as 35 ml of aqueous NaOH (50%) and 33 ml of epichlorohydrin, which are added during a period of 6-8 h. The reaction continues over night (ca. 16 h). The gel is washed with distilled water and 60% acetic acid is added to obtain a pH=5–6.

Example 3

Solidifying the Agarose Solution to Beads (Gel) by Emulsification.

Analogous to Example 2. 60 g ethyl cellulose (N-50 emulsifier), 580 ml toluene, and 400 ml agarose solution (2200 centipoise (60° C., pH 7–8)) from Example 1

Cross-linking the Gel

Analogous to Example 2. 30 g of Na$_2$SO$_4$, 200 ml of gel (drained), 50 ml of distilled water, 3 g of aqueous NaOH (50%), 0.2 g of NaBH$_4$, 27 ml of aqueous NaOH (50%) and 26 ml of epichlorohydrin.

Example 4

Preliminary Determination of Kav for the Material Obtained in Examples 2–3 and a Comparison with Sepharose 4 Fast Flow.

Sepharose 4 Fast Flow is commercially available from Amersham Pharmacia Biotech AB, Uppsala, Sweden). It is produced by a method comprising steps (a)–(c) above but utilising uncross-linked agarose (4%) in step (a). Included in the solution is also a cross-linker (epichlorohydrin). The results are given in the table.

| Dextran Mol. Weight | Example 2 Kav | Example 3 Kav | Sepharose 4FF Kav |
|---|---|---|---|
| 21400 | 0.79 | 0.72 | 0.78 |
| 67000 | 0.62 | 0.55 | 0.62 |
| 196300 | 0.42 | 0.34 | 0.44 |
| 401300 | 0.19 | 0.16 | 0.29 |

Examples 2–3 utilise solutions containing 4% agarose, which is essentially the same as used for the manufacture of Sepharose 4 Fast Flow. The results thus suggest that the use of a cross-linked but soluble polysaccharide influences the porosity (Kav) of the final matrix to a very low degree, if any, for dextran of low and medium molecular weights. For proteins and other bio-organic compounds that are more compact than dextran this means that Kav should be essentially constant up to at least 400,000 Dalton or more when increasing the viscosity of the agarose solution by cross-linking (solution I).

Example 5

Inclusion of Densifying Particles in Solution (a).

Preliminary results with densifying steel particles (Anval, 8.4 g/cm$^3$, Anval, Torshälla,Sweden) strongly suggests that an increase in viscosity by including the cross-linked but soluble polysaccharide in step (a) will give a reduced amount of beads lacking densifying particles.

We claim:

1. In a method for the manufacture of a solid porous separation material based on a polysaccharide, including the steps of
   (a) providing an aqueous solution of a polysaccharide;
   (b) dispersing into said solution or coating with said solution a plurality of densifying particles, which densifying particles have a density higher than the density of the solution; and
   (c) solidifying the solution by cooling to transform the solution to a gel, the improvement comprising modifying the viscosity of the aqueous polysaccharide from step (a) by cross-linking simultaneously with step (b).

2. The method of claim 1, wherein in step (b), the gel is solidified into the form of beads or a monolith.

3. The method of claim 1, wherein the polysaccharide used in step (a) is water-soluble above 25° C. and forms a gel 25° C. temperatures.

4. The method of claim 3, wherein the polysaccharide is selected from the group consisting of dextran, agarose, cellulose, starch and pullulan.

5. The method of claim 1, wherein, prior to step (b), the solution is disintegrated to drops that are transformed to a gel in step (b).

6. The method of claim 5, wherein the disintegration includes forming a suspension of the drops of the polysaccharide solution is the discontinuous phase in an organic solvent as the continuous phase.

7. The method of claim 5, wherein the disintegration results in formation of free drops.

8. The method of claim 7, wherein disintegration includes spraying the solution through a nozzle or by atomizing the solution by a spinning disc technique.

9. The method of claim 1, wherein the densifying particles have a density $\geqq 1.5$ g/cm$^3$.

10. The method of claim 1, wherein the densifying particles constitute $\leqq 95\%$ (v/v) of the polysaccharide solution.

11. The method of claim 1, wherein the polysaccharide before step (a), or during or after the subsequent sequence of steps is functionalized with ligands, which are part of affinity pairs.

* * * * *